(12) United States Patent
Lewis et al.

(10) Patent No.: US 8,701,406 B2
(45) Date of Patent: Apr. 22, 2014

(54) SHAPE MEMORY ALLOY POWERED HYDRAULIC ACCUMULATOR HAVING WIRE GUIDES

(75) Inventors: Garrett Lewis, Pearland, TX (US); Gangbing Song, Pearland, TX (US); Devendra Patil, Houston, TX (US)

(73) Assignee: University of Houston, Houston, TX (US)

( * ) Notice: Subject to any disclaimer, the term of this patent is extended or adjusted under 35 U.S.C. 154(b) by 475 days.

(21) Appl. No.: 12/842,003

(22) Filed: Jul. 22, 2010

(65) Prior Publication Data
US 2012/0017581 A1   Jan. 26, 2012

(51) Int. Cl.
*F01B 29/10*   (2006.01)
*F02G 1/04*   (2006.01)

(52) U.S. Cl.
USPC .............................................. 60/528; 60/527

(58) Field of Classification Search
USPC ......... 60/527–529, 398, 495–507; 290/42, 53
See application file for complete search history.

(56) References Cited

U.S. PATENT DOCUMENTS

| | | | |
|---|---|---|---|
| 1,370,544 A | 3/1921 | Leeper | |
| 3,058,185 A | 10/1962 | Clayton et al. | |
| 3,625,002 A * | 12/1971 | Davis | 60/528 |
| 4,806,815 A | 2/1989 | Honma | |
| 4,811,564 A | 3/1989 | Palmer | |
| 4,945,727 A | 8/1990 | Whitehead et al. | |
| 5,079,920 A | 1/1992 | Whitehead et al. | |
| 5,337,560 A | 8/1994 | Abdelmalek | |
| 5,842,312 A * | 12/1998 | Krumme et al. | 52/167.1 |
| 6,196,811 B1 | 3/2001 | Hasse | |
| 6,247,678 B1 * | 6/2001 | Hines et al. | 251/11 |
| 6,370,046 B1 | 4/2002 | Nebrigic et al. | |
| 6,374,608 B1 | 4/2002 | Corris et al. | |
| 6,447,478 B1 | 9/2002 | Maynard | |
| 6,464,200 B1 | 10/2002 | Hines et al. | |
| 6,574,958 B1 | 6/2003 | MacGregor | |
| 6,832,478 B2 | 12/2004 | Anderson et al. | |
| 7,070,577 B1 | 7/2006 | Haller et al. | |
| 2004/0106894 A1 | 6/2004 | Hunter et al. | |
| 2005/0200067 A1 | 9/2005 | Browne et al. | |
| 2007/0175642 A1 | 8/2007 | Shampine et al. | |

(Continued)

FOREIGN PATENT DOCUMENTS

FR   2718492 A1   10/1995
SU   1102890 A1   7/1984

OTHER PUBLICATIONS

U.S. Appl. No. 12/849,995, filed Jul. 22, 2010, Garrett Lewis, et al.

(Continued)

*Primary Examiner* — Kenneth Bomberg
*Assistant Examiner* — Wesley Harris
(74) *Attorney, Agent, or Firm* — Fletcher Yoder, P.C.

(57) ABSTRACT

A system, in certain embodiments, includes an accumulator having a first plate with a first wire guide and a second plate with a second wire guide. The second plate is positioned at an offset from the first plate, and the second plate is moveable relative to the first plate to adjust a fluid pressure. The accumulator also includes a plurality of shape memory alloy wires extending between the first and second plates, wherein the plurality of shape memory alloy wires extend along the first and second wire guides.

16 Claims, 11 Drawing Sheets

(56) References Cited

U.S. PATENT DOCUMENTS

| | | |
|---|---|---|
| 2008/0245432 A1 | 10/2008 | Lenz |
| 2009/0139727 A1 | 6/2009 | Tanju et al. |
| 2009/0159273 A1 | 6/2009 | Guerrero |
| 2009/0159295 A1 | 6/2009 | Guerrero et al. |
| 2011/0131964 A1* | 6/2011 | Kocurek et al. .................. 60/327 |

OTHER PUBLICATIONS

U.S. Appl. No. 12/841,998, filed Jul. 22, 2010, Garrett Lewis, et al.
U.S. Appl. No. 12/842,008, filed Jul. 22, 2010, Garrett Lewis, et al.
U.S. Appl. No. 12/631,424, filed Dec. 4, 2009, Chris Kocurek, et al.
Ning Ma, U. et al.; "Design and Performance Evaluation of an Ultradeepwater Subsea Blowout Preventer Control System Shape Memory Alloy Actuators;" SPE Annual Technical Conference and Exhibition; XP003023864, Sep. 24, 2006; pp. 1-8.
PCT International Preliminary Report and Written Opinion for PCT/US2010/049171, mailed on Jun. 14, 2012.
PCT Search Report and Written Opinion for PCT/US2011/034361, mailed on Sep. 5, 2011.
PCT Search Report and Written Opinion for PCT/US2011/034340, mailed on Sep. 30, 2011.
PCT Search Report and Written Opinion for PCT/US2011/034385, mailed on Sep. 5, 2011.
PCT Search Report and Written Opinion for PCT/US2011/034375, mailed on Sep. 2, 2011.

* cited by examiner

US 8,701,406 B2

SHAPE MEMORY ALLOY POWERED HYDRAULIC ACCUMULATOR HAVING WIRE GUIDES

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Deepwater accumulators provide a supply of pressurized working fluid for the control and operation of sub-sea equipment, such as through hydraulic actuators and motors. Typical sub-sea equipment may include, but is not limited to, blowout preventers (BOPS) that shut off the well bore to protect an oil or gas well from accidental discharges to the environment, gate valves for flow control of oil or gas to the surface or to other sub-sea locations, electro-hydraulic control pods, or hydraulically-actuated connectors and similar devices.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

Figure 1:
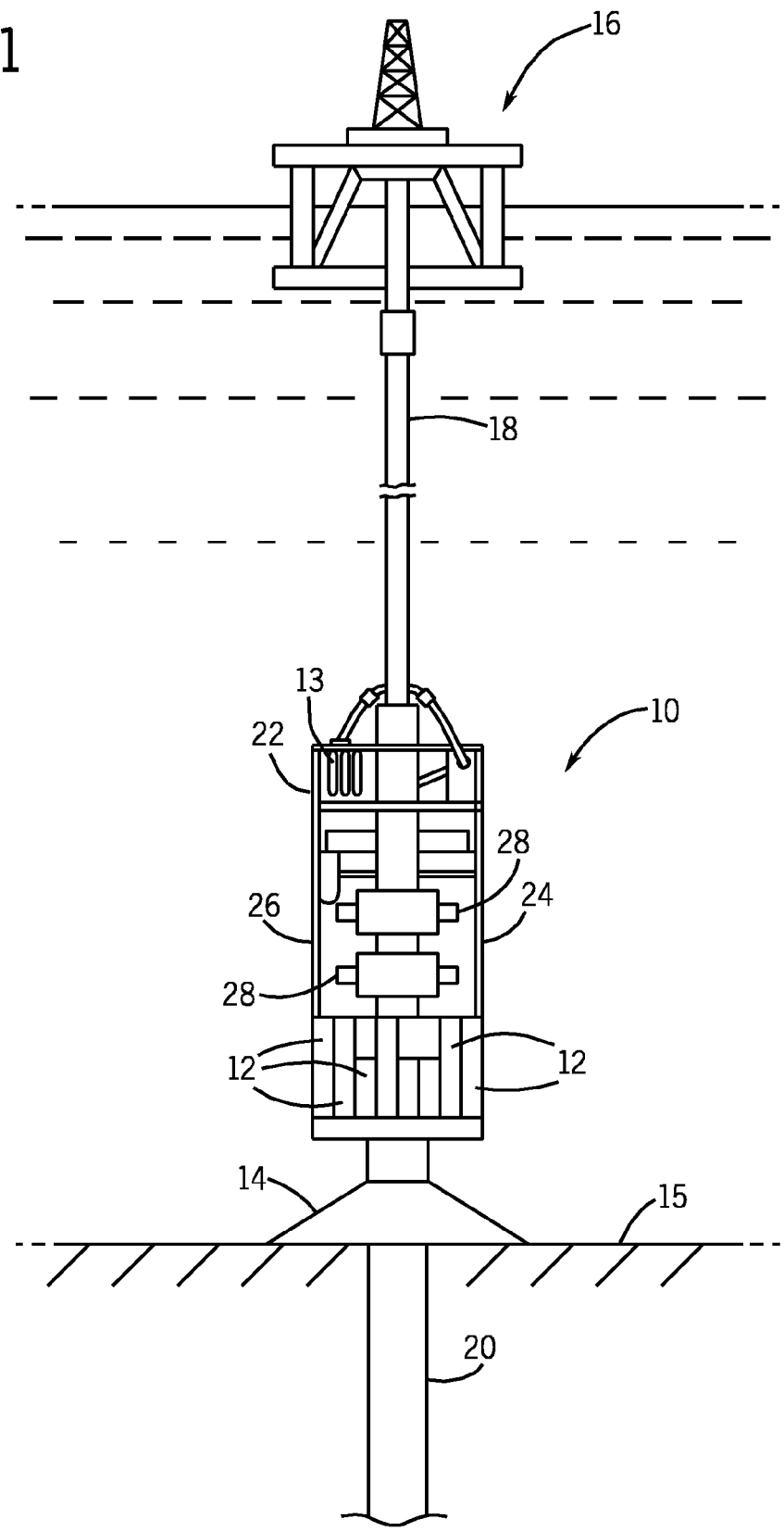
FIG. 1 is a schematic of an embodiment of a sub-sea BOP stack assembly having one or more shape memory alloy (SMA)-powered hydraulic accumulators.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Accumulators may be divided into a gas section and a hydraulic fluid section that operate on a common principle. The general principle is to pre-charge the gas section with pressurized gas to a pressure at or slightly below the anticipated minimum pressure to operate the sub-sea equipment. Fluid can be added to the accumulator in the separate hydraulic fluid section, compressing the gas section, thus increasing the pressure of the pressurized gas and the hydraulic fluid together. The hydraulic fluid introduced into the accumulator is therefore stored at a pressure equivalent to the pre-charge pressure and is available for doing hydraulic work. However, gas-charged accumulators used in sub-sea environments may undergo a decrease in efficiency as water depth increases. This loss of efficiency is due, at least in part, to an increase of hydrostatic stress acting on the pre-charged gas section, which provides the power to the accumulators through the compressibility of the gas.

The pre-charge gas can be said to act as a spring that is compressed when the gas section is at its lowest volume and greatest pressure and released when the gas section is at its greatest volume and lowest pressure. Accumulators may be pre-charged in the absence of hydrostatic pressure and the pre-charge pressure may be limited by the pressure containment and structural design limits of the accumulator vessel under surface ambient conditions. Yet, as described above, as accumulators are used in deeper water, their efficiency decreases as application of hydrostatic pressure causes the gas to compress, leaving a progressively smaller volume of gas to charge the hydraulic fluid. The gas section must consequently be designed such that the gas still provides enough power to operate the sub-sea equipment under hydrostatic pressure even as the hydraulic fluid approaches discharge and the gas section is at its greatest volume and lowest pressure.

For example, accumulators at the surface may provide 3,000 psi (pounds per square inch) maximum working fluid pressure. In 1,000 feet of seawater, the ambient pressure is approximately 465 psi. Therefore, for an accumulator to provide a 3,000 psi differential at the 1,000 foot depth, it must actually be pre-charged to 3,000 psi plus 465 psi, or 3,465 psi. At slightly over 4,000 feet water depth, the ambient pressure is almost 2,000 psi. Therefore, the pre-charge would be required to be 3,000 psi plus 2,000 psi, or 5,000 psi. In others words, the pre-charge would be almost double the working pressure of the accumulator. Any fluid introduced for storage may cause the pressure to exceed the working pressure and may lead to accumulator failure. Thus, at progressively greater hydrostatic operating pressures, the accumulator has greater pressure containment requirements at non-operational (e.g., no ambient hydrostatic pressure) conditions.

Given the limited structural capacity of the accumulator to safely contain the gas pre-charge, operators of this type of equipment may be forced to work within efficiency limits of the systems. For example, when deep water systems are required to utilize hydraulic accumulators, operators will often add additional accumulators to the system. Some accumulators may be charged to 500 psi, 2,000 psi, 5,000 psi, or higher, based on system requirements. As the equipment is initially deployed in the water, all accumulators may operate normally. However, as the equipment is deployed in deeper water (e.g., past 1,000 feet), the accumulators with the 500 psi pre-charge may become inefficient due to the hydrostatic compression of the gas charge. Additionally, the hydrostatic pressure may act on all the other accumulators, decreasing their efficiency. The decrease in efficiency of the sub-sea gas charged accumulators decreases the amount and rate of work which may be performed at deeper water depths. As such, for sub-sea equipment designed to work beyond 5,000 foot water depth, the amount of gas charged accumulators must be increased by 5 to 10 times. The addition of these accumulators increases the size, weight, and complexity of the sub-sea equipment, in addition to generating hundreds of potential additional failure points, all of which increases the cost and potential risk of equipment failure.

Conversely, the disclosed embodiments do not rely on gas to provide power for the accumulator. Rather, shape memory alloy (SMA) wires acting in tension on a piston provide the power. In addition, the back side of the piston may be balanced with the hydrostatic pressure at any water depth. This may be achieved through the use of a "sea chest," which is a rubber bladder which transfers hydrostatic pressure (from the water depth) to a fluid (e.g., the dielectric fluid on the back side of the SMA accumulator piston) on the other side. This means that the SMA material need only generate a reduced amount of power (compared to non-balanced accumulators) since it does not need to overcome the hydrostatic pressure load and no loss of efficiency is experienced due to water depth. Additionally, the SMA-powered hydraulic accumulator is not limited to constant pressure output since the actuation current of the SMA materials may be adjusted. Furthermore, the power output of the SMA materials may be adjusted without the need for pumps or valves. This may allow for the adjustment of output pressure from the accumulator, further increasing the flexibility of the equipment. In addition, leak paths may be substantially reduced using the disclosed embodiments.

The SMA-powered hydraulic accumulator may be used in various types of equipment. For instance, FIG. 1 depicts a sub-sea BOP stack assembly 10, which may include one or more large SMA-powered hydraulic accumulators 12 and/or one or more small SMA-powered hydraulic accumulators 13. The small SMA-powered hydraulic accumulators 13 may function similarly to the large SMA-powered hydraulic accumulators described herein, except that the small SMA-powered hydraulic accumulators 13 may be used for smaller sizes and capacities than the large SMA-powered hydraulic accumulators 12. As illustrated, the BOP stack assembly 10 may be assembled onto a wellhead assembly 14 on the sea floor 15. The BOP stack assembly 10 may be connected in line between the wellhead assembly 14 and a floating rig 16 through a sub-sea riser 18. The BOP stack assembly 10 may provide emergency fluid pressure containment in the event that a sudden pressure surge escapes the well bore 20. Therefore, the BOP stack assembly 10 may be configured to prevent damage to the floating rig 16 and the sub-sea riser 18 from fluid pressure exceeding design capacities. The BOP stack assembly 10 may also include a BOP lower riser package 22, which may connect the sub-sea riser 18 to a BOP package 24.

In certain embodiments, the BOP package 24 may include a frame 26, BOPS 28, and SMA-powered hydraulic accumulators 12, which may be used to provide backup hydraulic fluid pressure for actuating the BOPS 28. The SMA-powered hydraulic accumulators 12 may be incorporated into the BOP package 24 to maximize the available space and leave maintenance routes clear for working on components of the sub-sea BOP package 24. The SMA-powered hydraulic accumulators 12 may be installed in parallel where the failure of any single SMA-powered hydraulic accumulator 12 may prevent the additional SMA-powered hydraulic accumulators 12 from functioning.

In general, SMAS are materials which have the ability to return to a predetermined shape when heated. More specifically, when SMAS are below their transformation temperature, they have relatively low yield strengths and may be deformed into and retain any new shape relatively easy. However, when SMAS are heated above their transformation temperature, they undergo a change in crystal structure, which causes them to return to their original shape with much greater force than from their low-temperature state. During phase transformations, SMAS may either generate a relatively large force against any encountered resistance or undergo a significant dimension change when unrestricted. This shape memory characteristic may provide a unique mechanism for remote actuation.

One particular shape memory material is an alloy of nickel and titanium called Nitinol. This particular alloy is characterized by, among other things, long fatigue life and high corrosion resistance. Therefore, it may be particular useful as an actuation mechanism within the harsh operating conditions encountered with sub-sea mineral extraction applications. As an actuator, it is capable of up to approximately 5% strain recovery or approximately 500 MPa restoration stress with many cycles, depending upon the material composition. For example, a Nitinol wire 0.5 mm in diameter may generate as much as approximately 15 pounds of force. Nitinol also has resistance properties which enable it to be actuated electrically by heating. In other words, when an electric current is passed directly through a Nitinol wire, it can generate enough heat to cause the phase transformation. In addition, other methods of heating the SMA wire may be utilized. Although Nitinol is one example of an SMA which may be used in the SMA-powered hydraulic accumulators 12 and 13 of the disclosed embodiments, any SMAS with suitable transition temperatures and other properties may also be used. In many cases, the transition temperature of the SMA may be chosen such that surrounding temperatures in the operating environment are well below the martensite transformation point of the material. As such, the SMA may be actuated only with the intentional addition of heat.

The unique properties of SMAS make them a potentially viable choice for actuators. For example, when compared to piezoelectric actuators, SMA actuators may offer an advantage of being able to generate larger deformations and forces at much lower operating frequencies. In addition, SMAS may be fabricated into different shapes, such as wires and thin films. In particular, SMA wires with diameters less then 0.75 mm may be used to form stranded cables for use in the SMA-powered hydraulic accumulators 12. Accordingly, SMA-powered actuators such as the SMA-powered hydraulic accumulators 12 described herein may be used in myriad applications. For example, the SMA wires described below may be used in SMA-powered actuators such as hydraulic actuators, pneumatic actuators, mechanical actuators, and so forth. However, as described herein, the use of SMA wires may provide particular benefits in the realm of sub-sea equipment, such as the SMA-powered hydraulic accumulators 12 described in FIG. 1.

Figure 2:
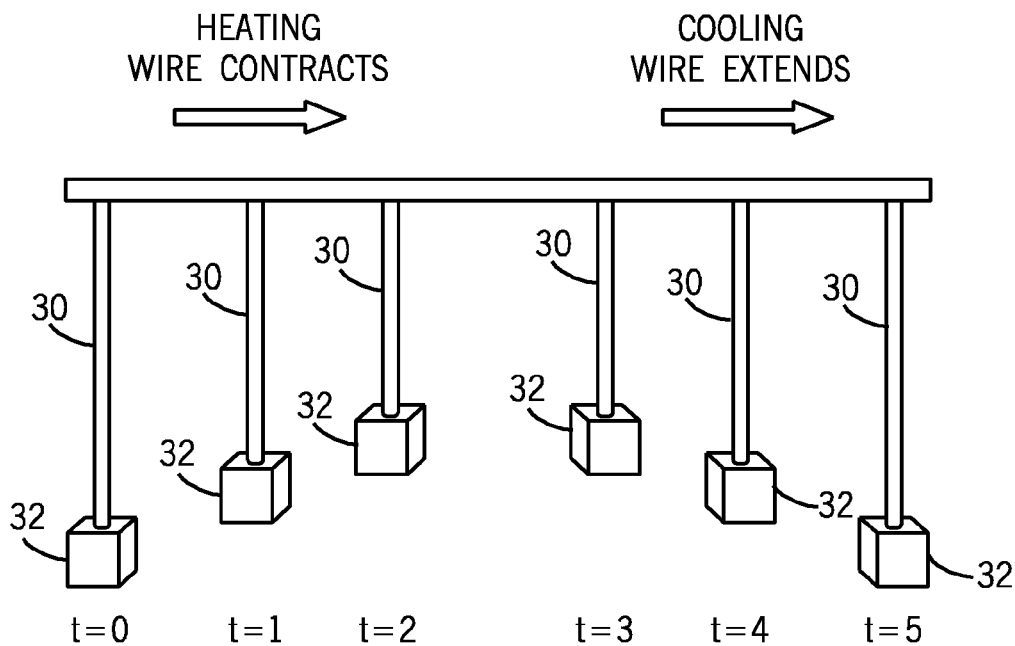
FIG. 2 is a schematic of an embodiment of a SMA wire being used to lift a weight.

FIG. 2 depicts an exemplary SMA wire 30 being used to lift a weight 32. In particular, moving from left to right, FIG. 2 illustrates a time series whereby an electrical current may be introduced through the SMA wire 30 to gradually heat the SMA wire 30 and then gradually cool the SMA wire 30. In particular, at initial time $t_0$, no electrical current flows through the SMA wire 30. At time $t_0$, the SMA wire 30 may be at a temperature below the transition temperature of the SMA wire 30. As such, the SMA wire 30 may have been extended to a deformed shape by the force applied to the SMA wire 30 by the weight 32. Once electrical current is applied to the SMA wire 30, the temperature of the SMA wire 30 may gradually increase such that the transition temperature of the SMA wire 30 may be exceeded. When this occurs, the SMA wire 30 may begin returning to its predetermined shape such that the gravitational force applied by the weight 32 may be overcome, resulting in the SMA wire 30 lifting the weight 32, as shown at time $t_1$. At some point, such as time $t_2$, the force applied by the weight 32 may be entirely overcome such that the SMA wire 30 returns to its predetermined shape. Therefore, from time $t_0$ to time $t_2$, the SMA wire 30 may be heated and, as a result, may contract and overcome the force of the weight 32. As described above, as the temperature of the SMA wire 30 increases through the transition temperature, the SMA wire 30 may either generate a relatively large force against any encountered resistance (e.g., against the force of the weight 32), undergo a significant dimension change when unrestricted (e.g. lifting the weight 32), or generate some force and undergo some dimension change at the same time (e.g., lifting the weight 32 to some distance below its predetermined state).

Conversely, at time $t_3$, the electrical current may cease flowing through the SMA wire 30. Once the electrical current ceases flowing through the SMA wire 30, the temperature of the SMA wire 30 may gradually decrease to below the transition temperature of the SMA wire 30. When this occurs, the force of the weight 32 may begin deforming the SMA wire 30, as shown at time $t_4$. At some point, such as time $t_5$, the force applied by the weight 32 may entirely overcome the SMA wire 30, extending it to the deformed shape from time $t_0$.

Therefore, from time $t_3$ to time $t_5$, the SMA wire 30 may be cooled and, as a result, may extend due to the force of the weight 32. As the temperature of the SMA wire 30 decreases through the transition temperature, the SMA wire 30 may undergo a significant dimension change when unrestricted (e.g. in allowing the weight 32 to lower).

Figure 3:
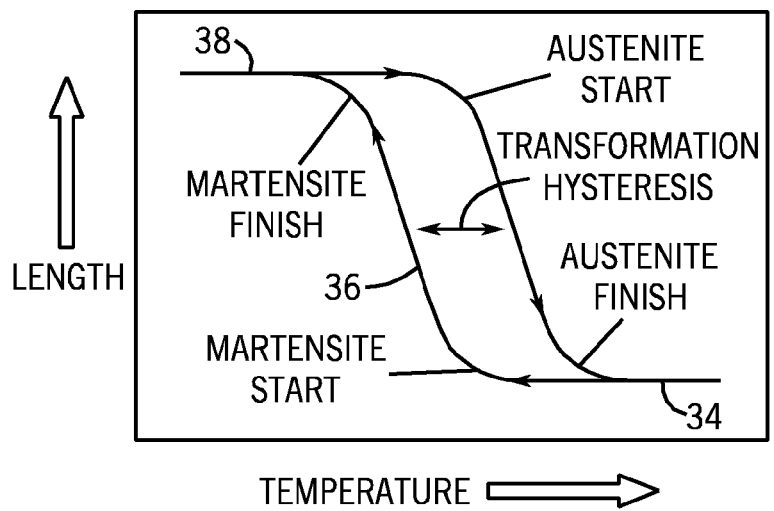
FIG. 3 is a graph of a SMA transitioning from an Austenite phase to a Martensite phase and back.

The unique properties of SMAS result from the reversible phase transformation between their crystal structures, for instance, the stronger high temperature Austenite phase and the weaker low temperature Martensite phase. FIG. 3 depicts an SMA transitioning from the Austenite phase to the Martensite phase and back. When cooling from its high temperature Austenite phase 34, the SMA undergoes a transformation to a twinned Martensite phase 36. The twinned Martensite phase 36 may be easily deformed by an external force. This process is often called de-twinning. The Martensite phase 38 is then reversed when the de-twinned structure reverts upon heating to the Austenite phase 34. The unique ability of a reversible crystalline phase transformation enables an SMA object either to recover its initial heat-treated shape (up to approximately 5% strain) when heated above a critical transition temperature or alternatively to generate high recovery stresses (in excess of 500 MPa). As shown in FIG. 3, the transformation exhibits a hysteretic effect, in that the transformations on heating and on cooling do not overlap. This hysteretic effect may be taken into account by a feedback control system with appropriate hysteresis compensation to achieve higher precision in either a position control or a force control system.

Figure 4:
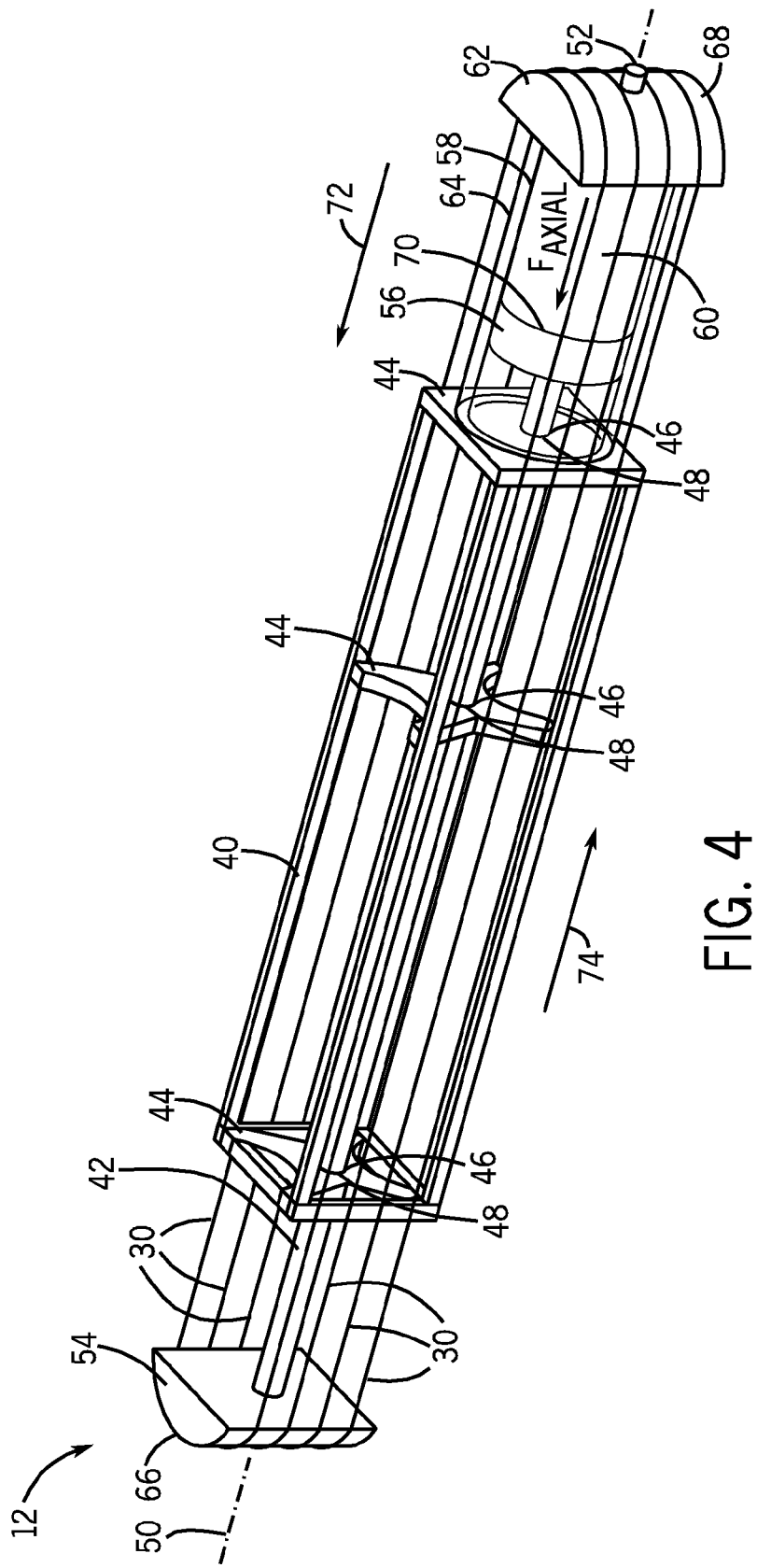
FIG. 4 is a perspective view of an embodiment of an SMA-powered hydraulic accumulator.

FIG. 4 depicts an exemplary embodiment of an SMA-powered hydraulic accumulator 12. As illustrated, the SMA-powered hydraulic accumulator 12 may include a frame 40 through which a rod 42 may extend. At least one frame support 44 may support the rod 42 within the frame 40. In particular, the rod 42 may pass through apertures 46 in each of the frame supports 44. More specifically, linear bearings 48 may support the rod 42 within the frame supports 44. As such, the linear bearings 48 may enable axial movement along a longitudinal axis 50 of the SMA-powered hydraulic accumulator 12.

In the present context, the term "proximal" generally refers to ends of components of the SMA-powered hydraulic accumulator 12 which are closer to a fluid inlet/outlet 52 of the SMA-powered hydraulic accumulator 12. Conversely, the term "distal" generally refers to ends of components of the SMA-powered hydraulic accumulator 12 which are farther away from the fluid inlet/outlet 52 of the SMA-powered hydraulic accumulator 12.

The rod 42 may be connected at a distal end to a first end cap 54 and at a proximal end to a piston 56. The piston 56 may fit inside and mate with an inner cylinder 58, forming a hydraulic seal within which fluid 60 may be accumulated. In addition, the piston 56 may be configured to move axially within the inner cylinder 58 when the rod 42 moves axially in the same direction, thereby adjusting the interior volume of the inner cylinder 58 within which the fluid 60 accumulates. The inner cylinder 58 may be connected at a distal end to a proximal frame support 44 and at a proximal end to a second end cap 62. The fluid 60 may enter and exit a proximal section of the inner cylinder 58 via the fluid inlet/outlet 52. In addition, in certain embodiments, the inner cylinder 58 may be radially surrounded by an outer cylinder 64 which may isolate the inner cylinder 58 from harsh external environmental conditions.

In certain embodiments, SMA wires 30 may be wrapped around the first and second end caps 54, 62 as illustrated in FIG. 4. For instance, the SMA wires 30 may form a plurality of continuous lengths of stranded or braided cables which extend from the first end cap 54 to the second end cap 62, wrap around the second end cap 62, extend from the second end cap 62 to the first end cap 54, and wrap around the first end cap 54. As such, the SMA wires 30 may generally be located on opposite sides of the SMA-powered hydraulic accumulator 12. However, in other embodiments, the SMA wires 30 may be located on all sides of the SMA-powered hydraulic accumulator 12. Indeed, in certain embodiments, instead of using SMA wires 30 as illustrated in FIG. 4, the SMA-powered hydraulic accumulator 12 may utilize thin films of SMA material, which may stretch from the first end cap 54 to the second end cap 62. Moreover, other arrangements of SMA material may be utilized.

In certain embodiments, the manner in which the SMA wires 30 are wrapped around the first and second end caps 54, 62 may be facilitated by the shape of the first and second end caps 54, 62, as shown in FIG. 4. More specifically, the cross-section of the first and second end caps 54, 62 may be semi-circular in nature, as shown. In addition, in certain embodiments, grooves may be extruded in the externally-facing surfaces 66, 68 of the first and second end caps 54, 62, respectively, within which the SMA wires 30 may be secured. In addition, in certain embodiments, the SMA wires 30 and/or grooves may be coated with a suitable electrically non-conductive material for electrical isolation of the SMA wires 30 from the rest of the system (e.g., for safety of the operators and other systems). Furthermore, in certain embodiments, other suitable fasteners may be used to secure the SMA wires 30 to the externally-facing surfaces 66, 68 of the first and second end caps 54, 62, respectively.

The SMA-powered hydraulic accumulator 12 may be designed such that normal operating temperatures are substantially below the transition temperature of the SMA wires 30. As such, the SMA wires 30 may normally be allowed to deform when subjected to particular forces. In particular, the fluid 60 within the inner cylinder 58 may be pressurized (e.g., by hydraulic and hydrostatic pressures). The pressure in the fluid 60 may exert axial forces $F_{axial}$ on a proximal face 70 of the piston 56 along the longitudinal axis 50. These axial forces $F_{axial}$ may urge the piston 56 to move distally along the longitudinal axis 50, as illustrated by arrow 72, allowing more fluid 60 to enter the inner cylinder 58. This axial movement of the piston 56 may force the rod 42 and the first end cap 54 to move distally along the longitudinal axis 50 as well. However, the second end cap 62 may generally remain in a fixed position. Therefore, under normal operating temperatures, the SMA wires 30 which are wrapped around the first and second end caps 54, 62 of the SMA-powered hydraulic accumulator 12 may be stretched as a result of the hydraulic and/or hydrostatic pressures of the fluid 60 within the inner cylinder 58. In particular, this stretching of the SMA wires 30 may generally occur axially along the longitudinal axis 50, as again illustrated by arrow 72.

However, once an electrical current begins flowing through the SMA wires 30, the temperature within the SMA wires 30 may begin to increase. At some point, the temperature may exceed the transition temperature for the SMA material used in the SMA wires 30. Once the transition temperature of the SMA wires 30 is exceeded, the SMA wires 30 may begin to contract toward their predetermined shape. The contraction of the SMA wires 30 may force the first and second end caps 54, 62 to move together axially along the longitudinal axis 50. More specifically, the second end cap 62 may again generally remain in its fixed position while the first end cap 54 may move axially toward the second end cap 62 (i.e., toward the proximal end of the SMA-powered hydraulic accumulator 12), as illustrated by arrow 74. As the second end cap 54 moves axially closer to the proximal end of the SMA-powered hydraulic accumulator 12, the rod 42 may also move in the same direction axially and may begin to force the piston 56 in the same axial direction as well. As such, the piston 56 may begin to counteract the axial forces $F_{axial}$ exerted by the pressure of the fluid 60 within the inner cylinder 58. As such, the piston 56 may begin displacing the fluid 60 within the inner cylinder 58, causing the fluid 60 to exit through the fluid inlet/outlet 52.

At some point, the SMA wires 30 may be restored to their predetermined shape and further heating via electrical current may no longer cause the SMA wires 30 to further contract. In certain embodiments, the SMA-powered hydraulic accumulator 12 may be designed such that the predetermined shape of the SMA wires 30 corresponds to a location of the piston 56 within the inner cylinder 58 which may cause substantially all of the volume of the fluid 60 to be evacuated from the inner cylinder 58. Likewise, in certain embodiments, the SMA-powered hydraulic accumulator 12 may be designed such that the maximum deformation shape for the SMA wires 30 corresponds to a location of the piston 56 within the inner cylinder 58 which may cause substantially all of the volume of the inner cylinder 58 to be filled with the liquid 60. However, in other embodiments, the predetermined shape and maximum deformation shape of the SMA wires 30 may correspond to other locations of the piston 56 within the inner cylinder 58.

In addition, in certain embodiments, the SMA-powered hydraulic accumulator 12 may be designed slightly differently. For example, in certain embodiments, the SMA-powered hydraulic accumulator 12 may not include a rod 42 connected between the first end cap 54 and the piston 56. Rather, in this embodiment, the first end cap 54 may instead be connected directly to the piston 56, which may extend distally from the inner cylinder 58 by a certain amount to allow for expansion and contraction of the SMA wires 30. Indeed, in certain embodiments, the SMA-powered hydraulic accumulator 12 may not include a first end cap 54. Rather, the SMA wires 30 may be wrapped directly around the piston 56.

The amount of volume of fluid 60 that the SMA-powered hydraulic accumulator 12 may be capable of displacing may vary based on the particular size of the SMA-powered hydraulic accumulator 12, the type of fluid 60 used, the pressure of the fluid 60, the type of SMA material used for the SMA wires 30, and so forth. In addition, although described herein as including a plurality of SMA wires, the SMA-powered hydraulic accumulator 12 may actually incorporate other designs for the SMA materials which provide the actuation power. For instance, in certain embodiments, the SMA materials may be in the shape of continuous, thin films which may wrap around the first and second end caps 54, 62 of the SMA-powered hydraulic accumulator 12.

As described above, the SMA-powered hydraulic accumulator 12 may be used in several different sub-sea applications, such as BOPS, gate valves, or hydraulically-actuated and similar devices. For example, as illustrated in FIG. 1, the BOP stack assembly 10 may include a plurality of SMA-powered hydraulic accumulators 12 working in parallel. The SMA-powered hydraulic accumulators 12 described herein may generally operate at lower frequencies than conventional hydraulic accumulators. However, since the SMA-powered hydraulic accumulators 12 act in tension on the piston 56 to provide power, do not need to overcome the hydrostatic pressure load, and do not experience efficiency loss due to water depth, the SMA-powered hydraulic accumulators 12 are generally more efficient than conventional hydraulic accumulators.

Figure 5:
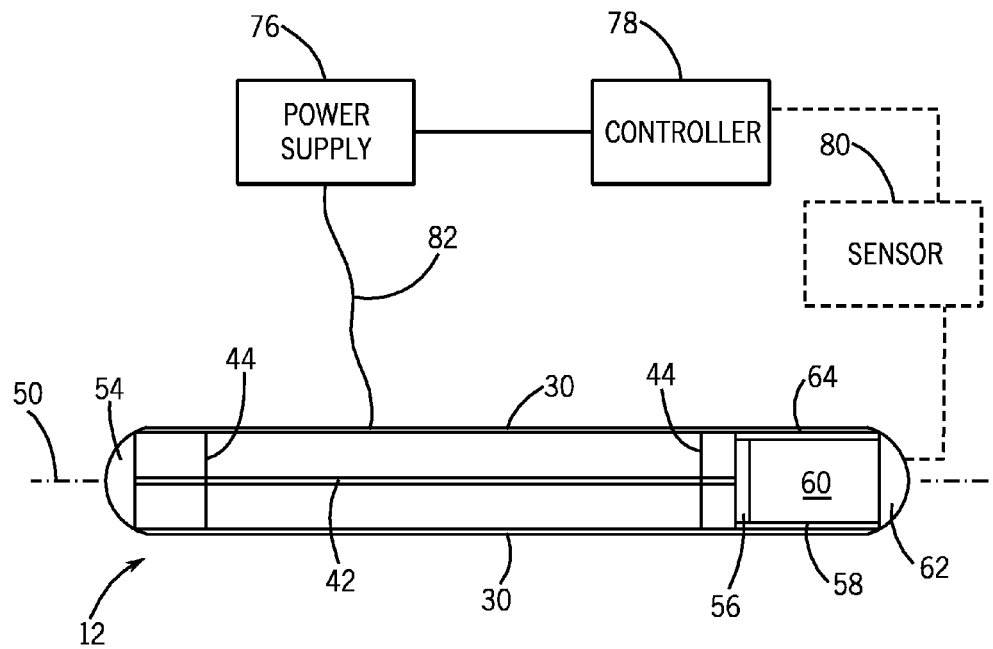
FIG. 5 is a schematic of an embodiment of the SMA-powered hydraulic accumulator of FIG. 4 with an associated power supply, controller, and sensor.

FIG. 5 is an exemplary embodiment of the SMA-powered hydraulic accumulator 12 of FIG. 4 with an associated power supply 76, controller 78, and sensor 80, which may be a single or group of pressure and/or displacement and/or force sensors. As illustrated, in certain embodiments, the SMA wires 30 of the SMA-powered hydraulic accumulator 12 may be heated with current from the power supply 76 via actuation wires 82. The power supply 76 may either be an alternating current (AC) or direct current (DC) power supply. In general, the use of AC power may be the easier and least expensive option (e.g., using a transformer). However, the use of DC power may be the more self-sustainable option (e.g., a battery and capacitor) given the remote nature of most sub-sea applications.

In certain embodiments, the supply of current to the SMA wires 30 via the actuation wires 82 may be controlled by the controller 78. In certain embodiments, the controller 78 may include a memory device and a machine-readable medium with instructions encoded thereon for determining how much (if any) current should be supplied from the power supply 76 to the SMA wires 30 of the SMA-powered hydraulic accumulator 12. In certain embodiments, the controller 78 may be configured to receive feedback from the sensor 80 attached to the SMA-powered hydraulic accumulator 12 and/or the application (e.g., the BOP stack assembly 10 of FIG. 1) within which the SMA-powered hydraulic accumulator 12 is being used to determine whether, and how much, current should be supplied to the SMA wires 30 via the actuation wires 82. For example, in certain embodiments, the controller 78 may be configured to receive sensor measurements (e.g., pressure measurements, temperature measurements, flow rate measurements, displacement measurements, and so forth) from the SMA-powered hydraulic accumulator 12 and/or the application within which the SMA-powered hydraulic accumulator 12 is being used. The controller 78 may use the sensor measurements to vary the amount of current supplied to the SMA wires 30. In certain embodiments, the controller 78 may contain specific code for determining a relationship between the current supplied to the SMA wires 30, the temperature of the SMA wires 30, the amount of deformation of the SMA wires 30 corresponding to changes in temperature, and so forth. For example, as described above, the amount of deformation of the SMA wires 30 may depend on the transition temperature of the SMA material used for the SMA wires 30.

Since the controller 78 may be capable of adjusting the current supplied to the SMA wires 30, the SMA-powered hydraulic accumulator 12 is not limited to constant pressure output. Furthermore, the power output of the SMA-powered hydraulic accumulator 12 may be adjusted without the need for pumps or valves, further increasing the flexibility of the SMA-powered hydraulic accumulator 12, among other things.

Figure 6:
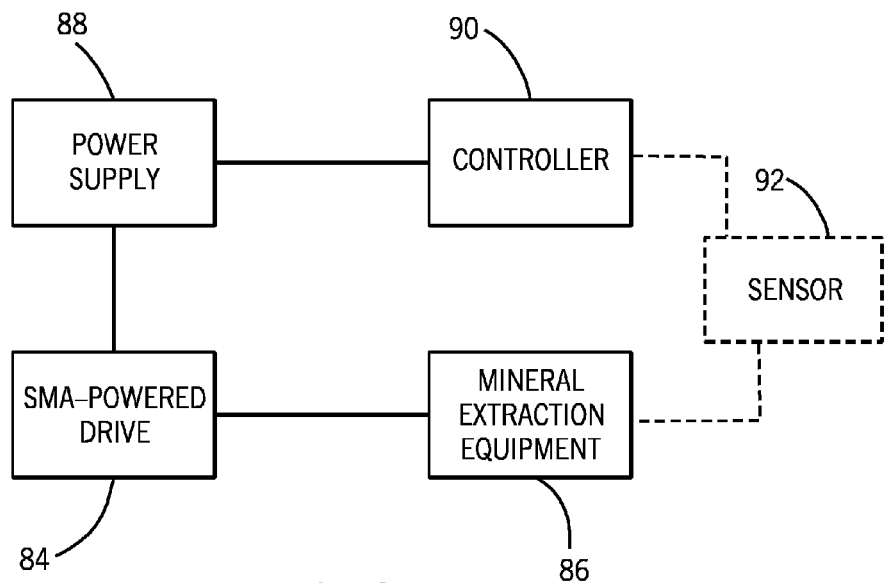
FIG. 6 is a schematic of an embodiment of an SMA-powered drive configured to drive a mineral extraction component.

Moreover, the disclosed embodiments may be extended to include other type of SMA-powered drives configured to drive various mineral extraction components. For example, FIG. 6 is an exemplary embodiment of an SMA-powered drive 84 which may be used to drive a mineral extraction component 86. A power supply 88, similar to the power supply 76 illustrated in FIG. 5, may be coupled to the SMA-powered drive 84 and a controller 90, similar to the controller 78 illustrated in FIG. 5, may be configured to adjust the power of the SMA-powered drive 84 to control a force generated by the SMA-powered drive 84 and sensor 92, similar to sensor 80 in FIG. 5, may be coupled to the mineral extraction component 86 or in between the mineral extraction component 86 and the SMA-powered drive 84. As described above, the force generated by the SMA-powered drive 84 may be cyclical based on the application of current from the power supply 88 to the SMA-powered drive 84. In general, the SMA-powered drive 84 may operate at somewhat lower frequencies but, depending on the particular design, may be capable of generating high forces. For example, in certain embodiments, the mineral extraction component 86 may be a fluid pump configured to be driven by the SMA-powered drive 84. Other types of mineral extraction components 86 which may be driven by the SMA-powered drive 84 may include, but are not limited to, pumps, compressors, valves, accumulators, and so forth. In addition, other types of equipment, other than mineral extraction equipment, may also be driven by the SMA-powered drive 84 using the disclosed techniques.

Figure 7:
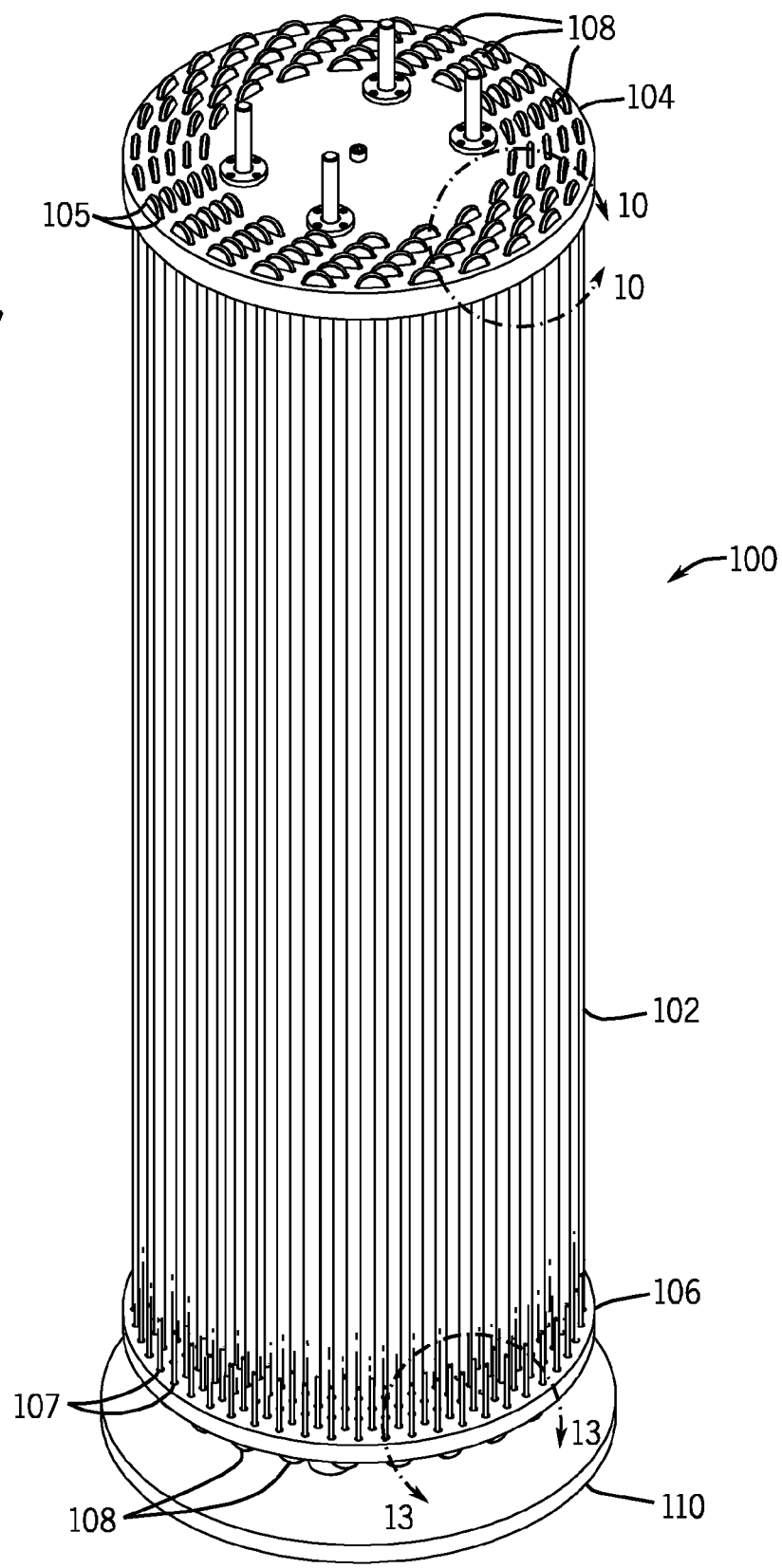
FIG. 7 is a perspective view of an embodiment of an SMA-powered hydraulic accumulator having perforated actuation plates, wire guides, and wire clamps.

FIG. 7 is a perspective view of another embodiment of an SMA-powered hydraulic accumulator 100 having perforated actuation plates, wire guides, and wire clamps. As illustrated, the SMA-powered hydraulic accumulator 100 includes a plurality of SMA wires 102 extending between a perforated top actuation plate 104 and a perforated bottom actuation plate 106. The top and bottom plates 104 and 106 are perforated with a plurality of wire openings 105 and 107, which pass the SMA wires 102 back and forth through the respective plates 104 and 106. The wire openings 105 and 107 are configured to maintain a desired spacing and alignment of the SMA wires 102 between the plates 104 and 106. In certain embodiment, a single SMA wire 102 may wind back and forth between the top and bottom plates 104 and 106. However, in the illustrated embodiment, one SMA wire 102 winds back and forth between the top and bottom plates 104 and 106 for each circular arrangement of wire openings 105 and 107. Thus, the illustrated embodiment includes a number of SMA wires 102 for the five concentric circular arrangements of SMA wires 102 winding back and forth between the top and bottom plates 104 and 106 (i.e., one SMA wire 102 per circular arrangement). Other embodiments may include more or fewer circular arrangements of SMA wires 102. Additionally, in further embodiments, the SMA wires 102 may be configured in arrangements of other types of enclosed shapes or polygons, such as squares, rectangles, triangles, etc., as well as other types of arrangements, such as Z-shaped or M-shaped arrangements, that do not necessarily form an enclosed shape.

At the top plate 104 and the bottom plate 106, the accumulator 100 includes a plurality of insulating wire guides 108 to gradually turn the SMA wires 102 in and out of the wire openings 105 and 107. As discussed below, the insulating wire guides 108 may have a curved path, such as a U-shaped path, that gradually bends the SMA wire 102 over a curvature of approximately 180 degrees. In this manner, the insulating wire guides 108 enable the SMA wire 102 to extend back and forth multiple times between the top and bottom plates 104 and 106, rather than requiring a pair of wire clamps at opposite ends of each individual run of the SMA wire 102 between the plates 104 and 106. For example, the illustrated embodiment may include one pair of wire clamps at opposite ends of each SMA wire 102 defining one of the circular arrangements of SMA wires 102, while the insulating wire guides 108 are used between the opposite ends of the SMA wire 102.

In the embodiment of FIG. 7, the top plate 104 is movable while the bottom plate 106 remains stationary. In particular, the bottom plate 106 is fixed to a base plate 110. As discussed below, a piston in a piston-cylinder assembly is driven by a hydraulic and/or hydrostatic pressure of fluid, thereby driving the plates 104 and 106 to expand away from one another in a manner stretching the SMA wires 102. However, as an electrical current begins flowing through the SMA wires 102, the temperature within the SMA wires 102 increases until it exceeds the transition temperature for the SMA material. Upon exceeding the transition temperature of the SMA wires 102, the SMA wires 102 may begin to contract toward their predetermined shape causing the top and bottom plates 104 and 106 to move toward one another. In this manner, the contracting movement of the plates 104 and 106 drives the piston in the piston-cylinder assembly against the fluid pressure.

Figure 8:
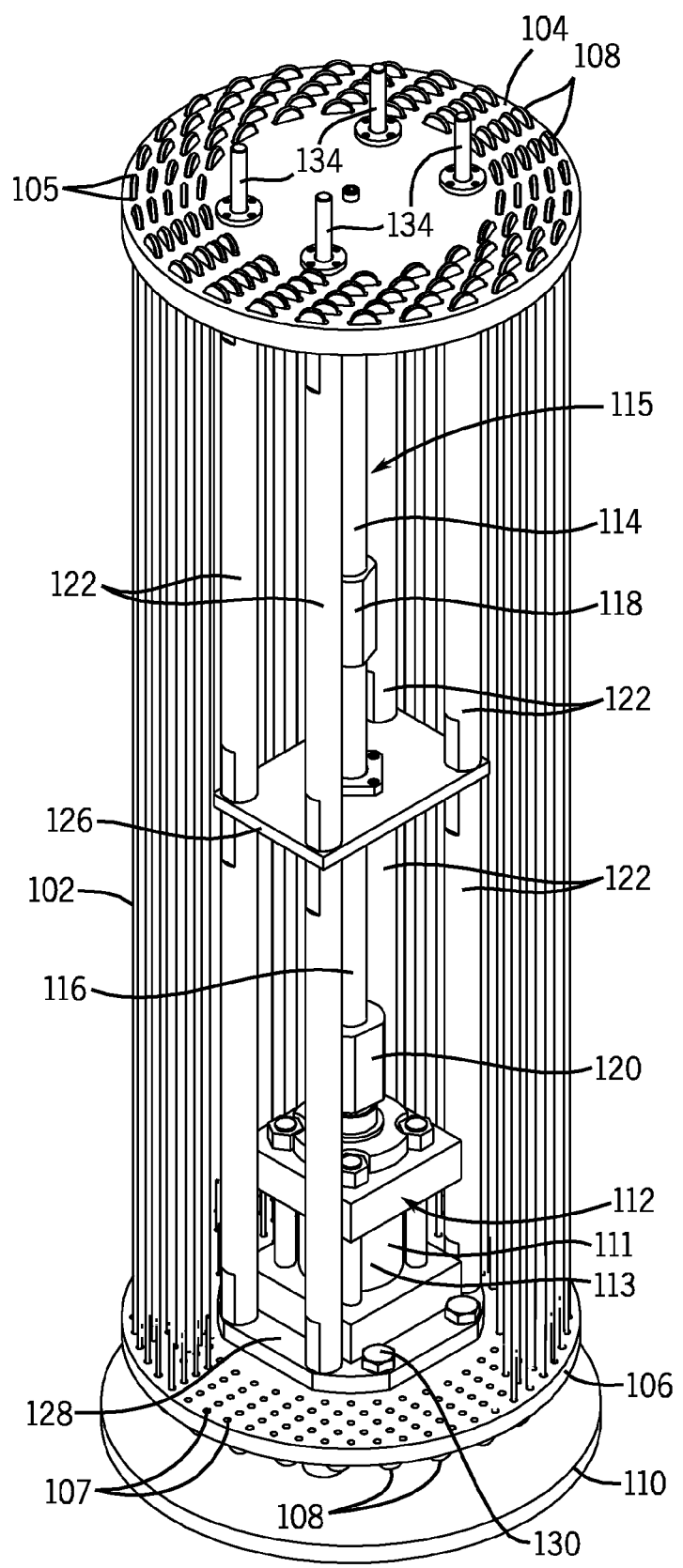
FIG. 8 is a cutaway perspective view of the SMA-powered hydraulic accumulator of FIG. 7, illustrating a portion of the SMA wires removed to show internal details.

FIG. 8 is a cutaway perspective view of the SMA-powered hydraulic accumulator 100 of FIG. 7, illustrating a portion of the SMA wires 102 removed to show internal details. As illustrated, the accumulator 100 includes a piston-cylinder assembly 112 having a piston 111 disposed in a cylinder 113, and a connecting rod assembly 115 coupled to the piston-cylinder assembly 112. The piston-cylinder assembly 113 is coupled to the bottom plate 106, while the connecting rod assembly 115 is coupled to the piston 111 and the top plate 104. In the illustrated embodiment, the connecting rod assembly 115 includes an upper connecting rod 114 and a lower connecting rod 116 coupled together via a turnbuckle 118. Likewise, the lower connecting rod 116 is coupled to the piston 111 via a turnbuckle 120. The illustrated accumulator 100 also includes upper and lower spacer rods 122, spacer plates 124 and 126 (FIG. 9), and a piston-cylinder base 128. The piston-cylinder base 128 secures the piston-cylinder assembly 112 to the bottom plate 106 via bolts 130.

As discussed below, the top plate 104, the connecting rod assembly 115, and the piston 111 move together in response to a fluid pressure change in the cylinder 113 and/or a temperature change of the SMA wires 102 sufficient to contract the SMA wires 102. During this movement, the spacer rods 122 and the spacer plates 124 and 126 are fixed relative to the bottom plate 106 and the cylinder 113 of the piston-cylinder assembly 112, while also guiding and limiting a range of movement of the top plate 104, the connecting rod assembly 115, and the piston 111. For example, the spacer rods 122 support the spacer plates 124 and 126 in stable positions relative to the bottom plate 106 and the cylinder 113, while the spacer plates 124 and 126 enable passage of the connecting rod assembly 115. As the connecting rod assembly 115 passes through the spacer plates 124 and 126, the connecting rod assembly 115 is generally restricted to motion to an axial direction. As discussed below, the spacer rods 122 and the spacer plate 126 limit axial movement of the top plate 104 inwardly toward the bottom plate 106. However, the spacer rods 122 (or extensions) also extend through the top plate 104, and enable movement of the top plate 104. As the spacer rods 122 (or extensions) pass through the top plate 104, the top plate 104 is generally restricted to motion to an axial direction. Operation of the accumulator 100 is discussed in further detail below.

Figure 9:
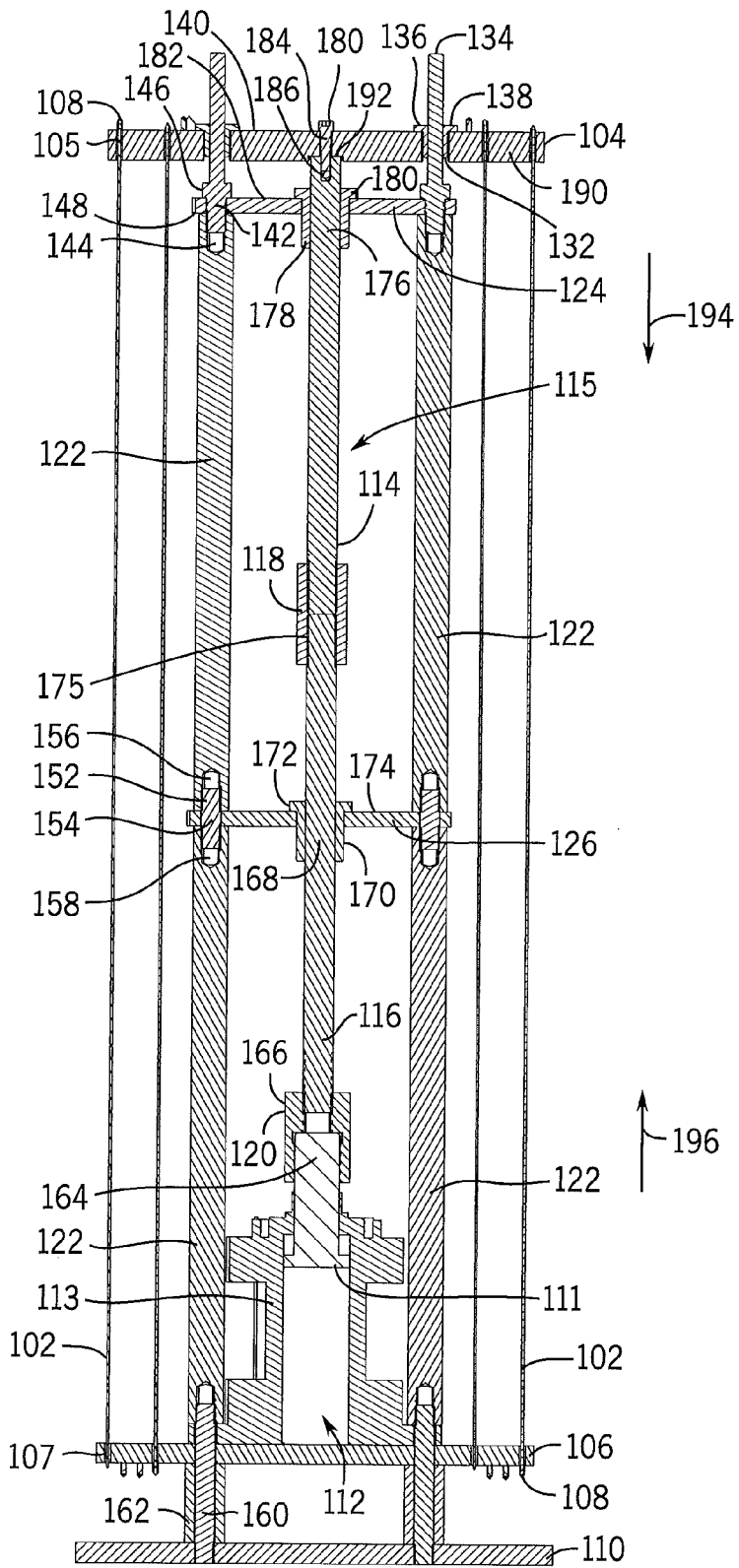
FIG. 9 is a cross-sectional view of the SMA-powered hydraulic accumulator of FIG. 7.

FIG. 9 is a cross-sectional view of the SMA-powered hydraulic accumulator 100 of FIG. 7, illustrating two of the five circular arrangements of SMA wires 102 extending between the plates 104 and 106. As illustrated, the SMA wires 102 extend upwardly through the wire openings 105 in the top plate 104, extend along a curvature of the wire guides 108, and then extend downwardly through the wire openings 105 in the top plate 104 toward the bottom plate 106. At the bottom plate 106, the SMA wires 102 extend downwardly through the wire openings 107 in the bottom plate 106, extend along a curvature of the wire guides 108, and then extend upwardly through the wire openings 107 in the bottom plate 106 toward the top plate 104. In certain embodiments, the accumulator 100 may include a single continuous SMA wire 102 (or bundle of SMA wires) that winds upwardly and downwardly between the top and bottom plates 104 and 106 through all of the wire openings 105 and 107 and associated wire guides 108. However, in the illustrated embodiment, the accumulator 100 may include a continuous SMA wire 102 (or bundle of SMA wires) for each circular arrangement of wire openings 105 and 106 and associated wire guides 108 in the top and bottom plates 104 and 106. At opposite ends of each SMA wire 102 (or bundle of SMA wires); the accumulator 100 includes a wire clamp.

In operation, the top plate 104 moves in response to fluid pressure in the piston-cylinder assembly 112 and/or contraction of the SMA wires 102. Thus, the top plate 104 moves with the connecting rod assembly 115 and the piston 111, while the spacer rods 122 and spacer plates 124 and 126 support and guide the top plate 104, rod assembly 115, and piston 111 to ensure linear motion parallel to the SMA wires 102. For example, the top plate 104 includes rod openings 132 to enable passage of alignment rods 134 coupled to the spacer rods 122. The top plate 104 also includes bushings or bearings 136 mounted in the rod openings 132 around the alignment rods 134. The illustrated bearings 136 are annular shaped bearings with a circular flange or lip 138 mounted along a top surface 140 of the top plate 104. For example, bolts may extend through the lip 138 into the top plate 104 to secure the bearings 136 to the top plate 104.

In the illustrated embodiment, the alignment rods 134 connect to the upper spacer rods 122 via openings 142 in the upper spacer plate 124 and openings 144 in a top portion 148 of spacer rods 122. The alignment rods 134 also include a circular flange or lip 146 to hold the upper spacer plate 124 against the upper spacer rods 122. For example, the alignment rods 134 may thread into the openings 144 to pull the lip 146 downwardly against the upper spacer plate 124 to compressively hold the upper spacer plate 124 between the lip 145 and the top portion 148 of the upper spacer rods 122. As discussed in further detail below, the upper spacer plate 124 surrounds and guides movement of the connecting rod assembly 115, thereby providing support for the axial movement of the top plate 104, the connecting rod assembly 115, and the piston 111. The lip 146 and/or the upper spacer plate 124 also may serve as an axial stop to limit axial movement of the top plate 104 downwardly toward the bottom plate 106 during contraction of the SMA wires 102.

The upper and lower spacer rods 122 are coupled together about the lower spacer plate 126 via studs 152 (e.g., threaded studs). For example, the studs 152 may extend through the lower spacer plate 126 via openings 156, and thread into openings 156 and 158 (e.g., threaded receptacles) in the upper and lower spacer rods 122. As the studs 152 thread into the openings 156 and 158, the upper and lower spacer rods 122 compressively hold the lower spacer plate 126 in position about the connecting rod assembly 115. As discussed in further detail below, the lower spacer plate 126 surrounds and guides movement of the connecting rod assembly 115, thereby providing support for the axial movement of the top plate 104, the connecting rod assembly 115, and the piston 111.

The lower spacer rods 122 are coupled to the cylinder base 128 of piston-cylinder assembly 112 via studs 160. The illustrated studs 160 extend through the cylinder base 128, the bottom plate 106, and spacers 162, while also coupling to the lower spacer rods 122 and the base plate 110. For example, the studs 160 may thread into the lower spacer rods 122, while fixedly coupling (e.g., weld) to the base plate 110. In this manner, the studs 160 securely hold the spacer rods 122, the piston-cylinder assembly 112, the bottom plate 106, and the base plate 110 in a fixed or stationary position relative to one another. As a result, the spacer rods 122 securely hold the spacer plates 124 and 126 about the connecting rod assembly 115, and the spacer rods 122 securely hold the alignment rods 134 in the rod openings 132 through the top plate 104.

The alignment rods 134, the upper and lower spacer rods 122, and the spacer plates 124 and 126 cooperatively support and align the connecting rod assembly 115 and the top plate 104, thereby restricting motion to the linear/axial direction parallel to the SMA wires 102. The lower connecting rod 116 is coupled to a piston rod 164 of the piston 111 via the turnbuckle 120. For example, the turnbuckle 120 may include threads 166 coupled to mating threads on the rods 116 and 164. The lower connecting rod 116 extends through an opening 168, which includes a bushing or bearing 170, in the lower spacer plate 126. The illustrated bearing 170 is an annular shaped bearing with a circular flange or lip 172 mounted along a top surface 174 of the lower spacer plate 126. For example, bolts may extend through the lip 172 into the lower spacer plate 126 to secure the bearing 170 to the lower spacer plate 126. The upper and lower connecting rods 114 and 116 are coupled together (e.g., via threads 175) at the turnbuckle 118. At the upper spacer plate 124, the upper connecting rod 114 extends through an opening 176, which includes a bushing or bearing 178. The illustrated bearing 178 is an annular shaped bearing with a circular flange or lip 180 mounted along a top surface 182 of the upper spacer plate 124. For example, bolts may extend through the lip 180 into the upper spacer plate 124 to secure the bearing 178 to the upper spacer plate 124. The upper connecting rod 114 is coupled to the top plate 104 via a fastener, such as a bolt 184, which threads into openings 186 and 188 in the rod 114 and plate 104. The top plate 104 also includes a bottom surface 190 having a counter bore 192 to receive the upper connecting rod 114, thereby providing alignment and lateral support for the connection between the rod 114, plate 104, and bolt 104.

In operation, the piston 111, the connecting rod assembly 115, and the top plate 104 may move linearly away (direction 196) from the bottom plate 106 in response to fluid pressure in the piston-cylinder assembly 112, while the piston 111, the connecting rod assembly 115, and the top plate 104 may move linearly toward (direction 194) the bottom plate 106 in response to electrical current flowing through the SMA wires 102. As discussed above, the electrical current flowing through the SMA wires 102 gradually increases the temperature of the SMA wires 102 until the temperature exceeds the SMA transition temperature, thereby causing contraction of the SMA wires 102 and thus movement of the top plate 104 toward (direction 194) the bottom plate 106. Upon reducing or removing the electrical current, the SMA wires 120 temperatures will decrease and applied external fluid pressure will expand/stretch SMA, thereby allowing the top plate 104 to move away from the bottom plate 106. During movement in the downward and upward directions 194 and 196, the connecting rod assembly 115 is guided by the bearings 170 and 178 in the spacer plates 124 and 126, and the top plate 104 is guided by the bearings 136 around the alignment rods 134. Furthermore, the wire openings 105 and 107 in the top and bottom plates 104 and 106 maintain alignment and spacing between the SMA wires 102, the wire guides 108 maintain a gradual bend of the SMA wires 102 between adjacent wire openings 105 and 107, and the wire clamps secure the SMA wires 102.

Figure 10:
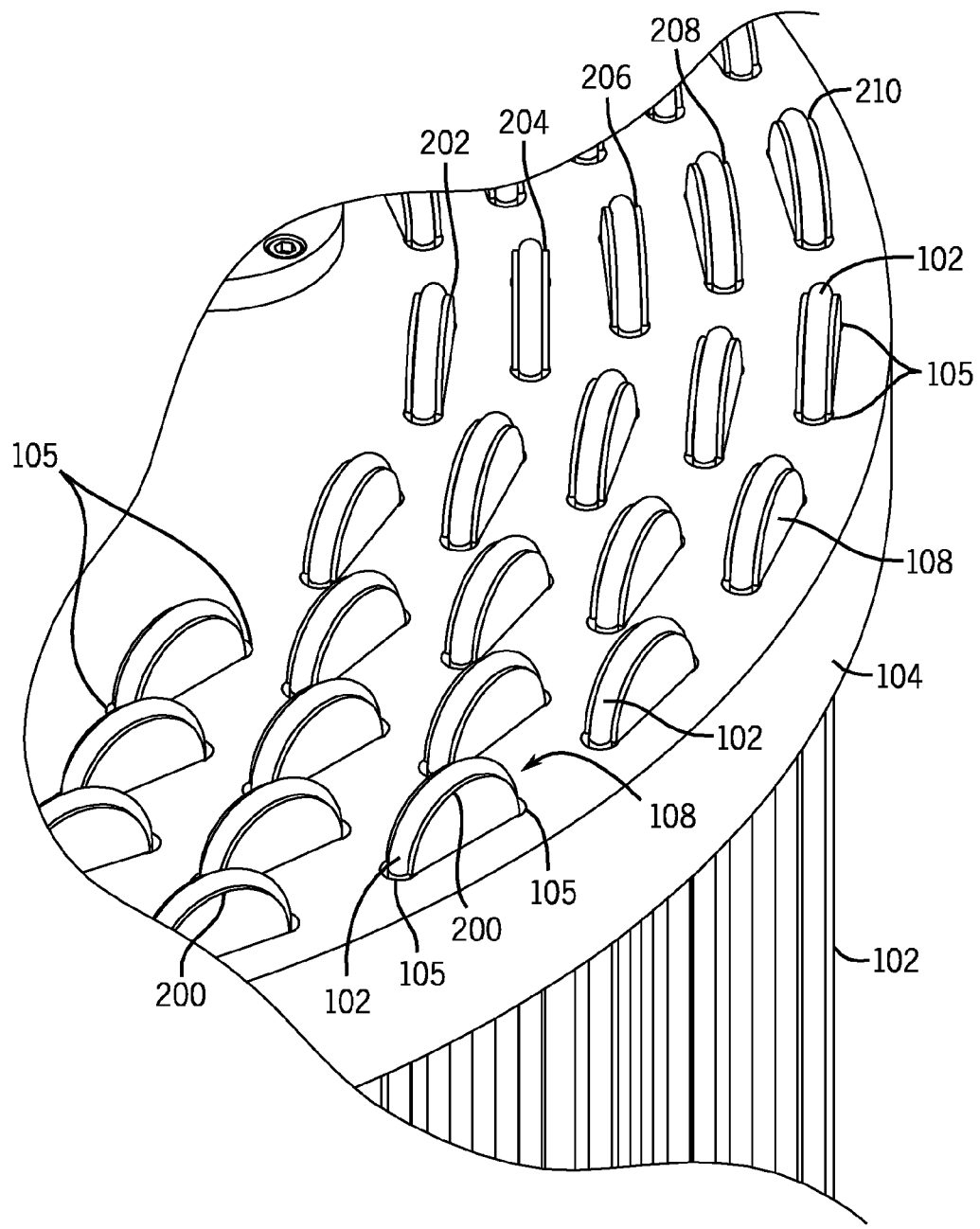
FIG. 10 is a partial perspective view of the SMA-powered hydraulic accumulator of FIG. 7 taken within line 10-10, illustrating details of the wire guides.

FIG. 10 is a partial perspective view of the SMA-powered hydraulic accumulator 100 of FIG. 7 taken within line 10-10, illustrating details of the insulating wire guides 108. As illustrated, the SMA wires 102 extend along a curved path 200 of the insulating wire guides 108 between adjacent wire openings 105 in the top plate 104. The curved path 200 of the wire guides 108 is configured to reduce stress on the SMA wire 102, while also enabling use of a continuous SMA wire 102 across many wire openings 105 and 107 rather than a severed SMA wire 102 with a wire clamp at each individual wire opening 105 or 107. For example, the curved path 200 may be a semi-circular or U-shaped path, wherein the SMA wire 102 is recessed within the wire guide 108. Thus, the curved path 200 provides lateral support for the SMA wire 102.

The wire openings 105 and 107, in cooperation with the wire guides 108, maintain the spacing and orientation of the SMA wires 102 between the top and bottom plates 104 and 106. As illustrated in FIG. 10, the insulating wire guides 108 are arranged in concentric circular arrangements 202, 204, 206, 208, and 210 on the illustrated top plate 104 as well as the bottom plate 106. In the illustrated embodiment, each circular arrangement 202, 204, 206, 208, and 210 has a continuous SMA wire 102 (or bundle of SMA wires) winding back and forth between the top and bottom plates 104 and 106. As a result, the illustrated embodiment has multiple continuous SMA wires 102 corresponding to the five circular arrangements 202, 204, 206, 208, and 210. In certain embodiments, a single SMA wire 102 (or bundle of SMA wires) may wind back and forth between the top and bottom plates 104 and 106 for all of the wire openings 105 and 107. However, the wire openings 105 and 107 may be arranged with any number of concentric circular arrangements (e.g., 1 to 10) or other patterns.

Figure 11:
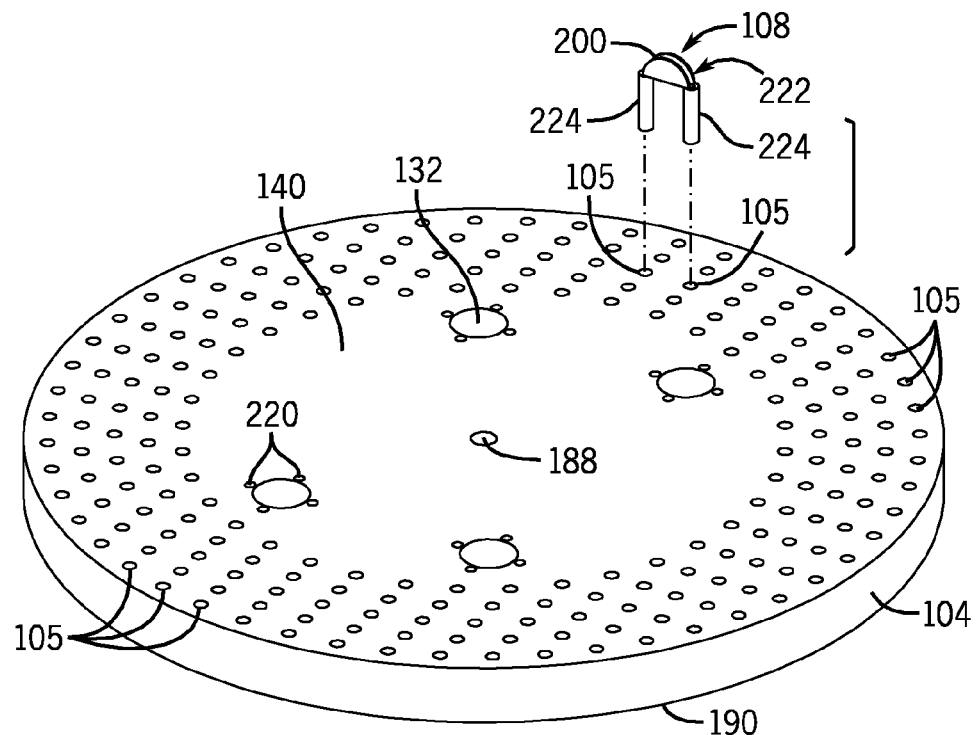
FIG. 11 is a perspective view of an embodiment of a perforated top plate of the SMA-powered hydraulic accumulator of FIG. 7, illustrating a wire guide exploded from a pair of wire openings in the perforated top plate.

FIG. 11 is a perspective view of an embodiment of the top plate 104 of the SMA-powered hydraulic accumulator 100 of FIG. 7, illustrating one wire guide 108 exploded from a pair of wire openings 105. The top plate 104 is perforated with a plurality of differently sized openings 105, 132, 188, and 220 extending between the top and bottom surfaces 140 and 190. The wire openings 105 enable passage of the SMA wires 102. The rod openings 132 enable passage of the alignment rods 134. The opening 188 enables passage of the bolt 184 into the upper connecting rod 114. The openings 220 enable passage of fasteners to secure the bearings 136 to the top plate 104. For example, bolts or other threaded fasteners may extend through the lips 138 of the bearings 136 into threaded openings 220.

As illustrated in FIG. 11, the wire guide 108 includes a guide body 222 and a pair of insulating sleeves or spacers 224. The guide body 222 includes the curved path 200, which may be recessed into the body 222. The insulating spacers 224 are disposed on opposite ends of the curved path 200 in alignment with adjacent wire openings 105 in the top plate 104. In the illustrated embodiment, the insulating spacers 224 are hollow cylindrical structures made of an insulating material (e.g., thermal and/or electrically insulating material), wherein an outer diameter of the spacers 224 is sized to fit within the wire openings 105 and an inner diameter of the spacers 224 is sized to pass the SMA wire 102. Accordingly, the insulating spacers 224 may be inserted securely into the wire openings 105 to electrically and/or thermally isolate the SMA wires 102 from the top plate 104. Similarly, the insulating spacers 224 may be inserted securely into the wire openings 107 to electrically and/or thermally isolate the SMA wires 102 from the bottom plate 106. In certain embodiments, the insulating spacers 224 may be secured to the wire openings 105 and 107 via a threaded interface, an adhesive, an interference or press fit, or another suitable connection.

Although the illustrated guide body 222 is an independent structure, some embodiments may integrate a plurality of guide bodies 222 with the top plate 104, the bottom plate 106, and/or the spacers 224. For example, the plates 104 and 106 may be cast and/or machined to include a plurality of wire openings 105 and 107 and associated guide bodies 222. The guide bodies 222 may be recessed into the plates 104 and 106, or the guide bodies 222 may protrude from the plates 104 and 106. However, any suitable construction is within the scope of the disclosed accumulator 100.

Similarly, although the illustrated spacers 224 are independent structures, some embodiments may integrate the insulating spacers 224 with the SMA wires 102, the top plate 104, the bottom plate 106, or the guide body 222. For example, an insulating coating may be applied to the SMA wires 102, the top plate 104, and/or the bottom plate 106. The insulating coating may be limited to the wire openings 105 and 107, or may extend onto other areas of the SMA wires 102, the top plate 104, the bottom plate 106, or the guide body 222. In one embodiment, each SMA wire 102 may include an insulating sleeve or coating along an entire length of the SMA wire 102. In another embodiment, the top and bottom plates 104 and 106 may be entirely coated with an insulating material. By further example, the wire guide 108 may be a one-piece structure including the guide body 222 and the spacers 224, wherein the one-piece structure is entirely made of or coated with an electrically insulating material.

In the illustrated embodiment, the top and bottom plates 104 and 106 are circular in shape. In some embodiments, the top and bottom plates 104 and 106 may have non-circular shapes, such as oval, rectangular, triangular, hexagonal, or other suitable shapes. The top and bottom plates 104 and 106 also may have a variety of patterns or distributions of wire openings 105 and 107, which may be based at least partially on the shape of the plates 104 and 106. For example, the illustrated circular plates 104 and 106 have the concentric circular arrangements 202, 204, 206, 208, and 210 of wire openings 105 and 107. In contrast, rectangular shaped plates 104 and 106 may have linear rows and columns of wire openings 105 and 107.

Figure 12:
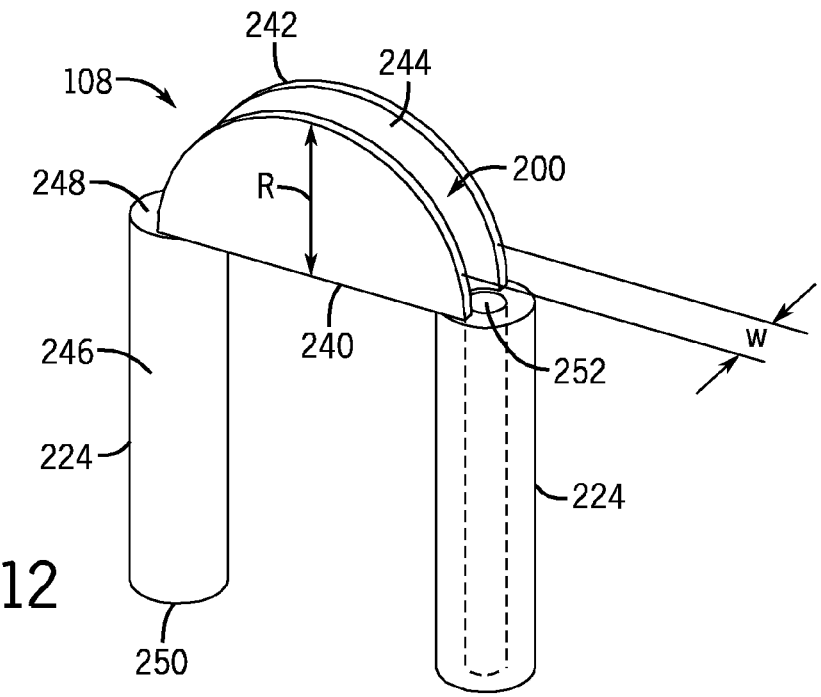
FIG. 12 is a perspective view of an embodiment of a wire guide.

FIG. 12 is an exemplary embodiment of the wire guide 108. As illustrated, the wire guide 108 includes the guide body 222 and the pair of insulating spacers 224. The guide body 222 has a flat bottom surface 240 and a curved top surface 242, which includes the curved path 200 recessed to define a curved groove 244 (e.g., U-shaped groove). The curved groove 244 has a width W sized to fit the SMA wire 102. The curved surface 242 defines a radius of curvature R, which may be selected based on the spacing between adjacent wire openings 105 or 107, the diameter of the SMA wire 102, and other considerations. The radius of curvature R may be configured to reduce stress in the SMA wires 102, while also enabling use of a continuous length of SMA wire 102 across multiple wire openings 105 and 107.

As illustrated, the insulating spacers 224 have a cylindrical outer surface 246, a ring-shaped top surface 248, a ring-shaped bottom surface 250, and a wire passage 252 extending between surfaces 248 and 250. The wire passage 252 may be sized equal to or greater than the diameter of the SMA wire 102. The insulating spacers 224 generally align the wire passages 252 with opposite ends of the curved groove 244 of the guide body 222, thereby defining a U-shaped path through the plates 104 and 106 from one side to another. The illustrated spacers 224 may have a smooth cylindrical outer surface 246 configured to fit loosely or press-fit securely into the wire openings 105 and 107. However, the cylindrical outer surface 246 of the spacers 224 may include surface roughness, threads, or a taper to provide more secure mounting in the wire openings 105 and 107. In certain embodiments, the spacers 224 may extend partially or completely (e.g., 25 to 100 percent) through the wire openings 105 and 107. However, the spacers 224 may remain in close proximity, or in contact with, the guide bodies 222 of the wire guides 108.

The wire guide 108 may be made at least partially or substantially of metal, ceramic, plastic, or some combination thereof. For example, the guide body 222 and spacers 224 may be made of steel with an insulating coating. By further example, the guide body 222 and spacers 224 may be made entirely of an insulating material, such as a plastic or ceramic. The insulating material may be selected to provide electrical insulation and thermal insulation sufficient for the SMA materials used for the SMA wires 102.

Figure 13:
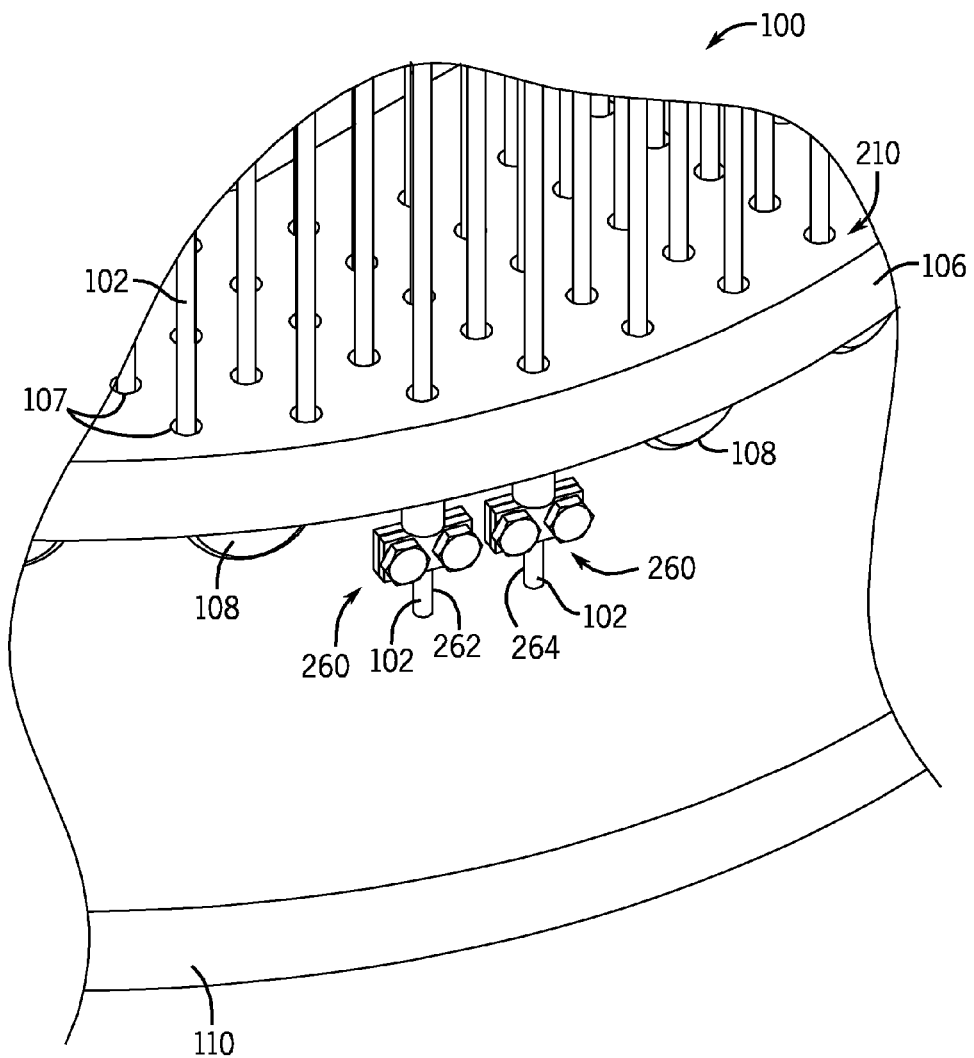
FIG. 13 is a partial perspective view of an embodiment of the SMA-powered hydraulic accumulator of FIG. 7 taken within line 13-13, illustrating details of the wire clamps.

FIG. 13 is a partial perspective view of an embodiment of the SMA-powered hydraulic accumulator 100 of FIG. 7 taken within line 13-13, illustrating details of wire clamps 260. As illustrated, the wire clamps 260 are coupled to opposite end portions 262 and 264 of the SMA wire 102 (e.g., continuous SMA wire) in the circular arrangement 210. In other words, the illustrated SMA wire 102 represents a single continuous SMA wire 102 that winds back and forth between the top and bottom plates 104 and 106 until a full circle (or any other suitably configured shape-arrangement) is completed as indicated by the opposite end portions 262 and 264. In the illustrated embodiment, a pair of wire clamps 260 is used to secure the opposite end portions 262 and 264 of each SMA wire 102 used in one of the concentric circular arrangements 202, 204, 206, 208, and 210. In other embodiments, a greater or lesser number of clamps 260 may be used depending on the pattern of wire openings 105 and 107, and the number of SMA wires 102 used to wind back and forth between these openings 105 and 107.

Figure 14:
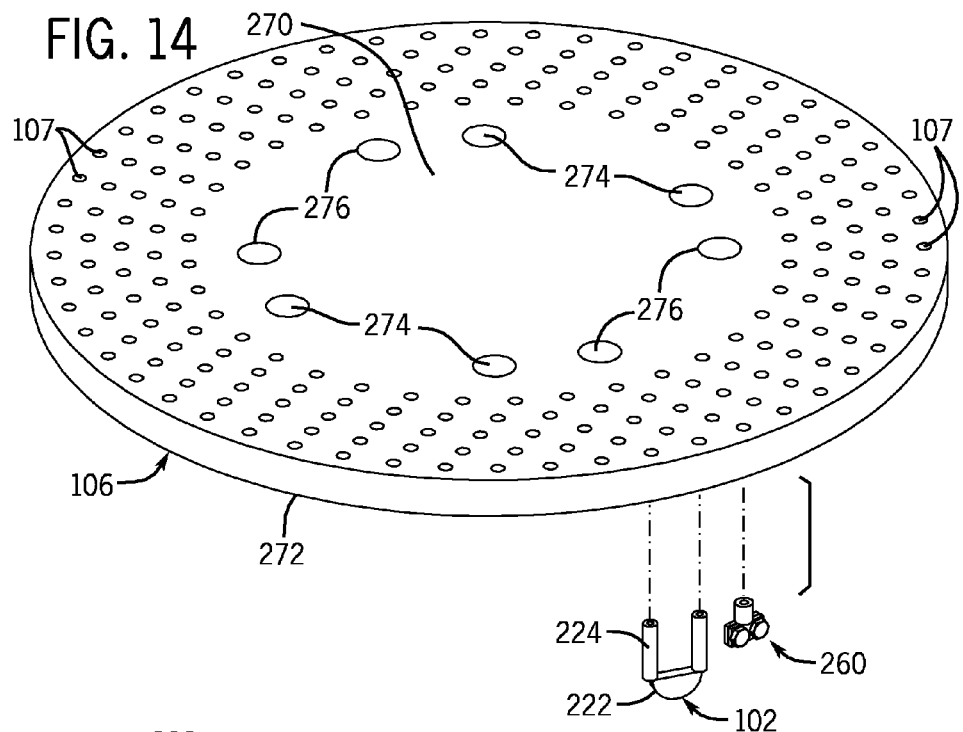
FIG. 14 is a perspective view of an embodiment of a perforated bottom plate of the SMA-powered hydraulic accumulator of FIG. 7, illustrating a wire guide and a wire clamp exploded from wire openings in the perforated bottom plate.

FIG. 14 is a perspective view of an embodiment of the bottom plate 106 of the SMA-powered hydraulic accumulator 100 of FIG. 7, illustrating a wire guide 108 and a wire clamp 260 exploded from wire openings 107 in the bottom plate 106. The bottom plate 106 is perforated with a plurality of differently sized openings 107, 274 and 276 extending between top and bottom surfaces 270 and 272. The wire openings 107 enable passage of the SMA wires 102. The openings 274 enable passage of the studs 160. The opening 276 enables passage of the bolts to secure the piston-cylinder assembly 112 to the bottom plate 106. The openings 220 enable passage of fasteners to secure the bearings 136 to the bottom plate 106. For example, bolts or other threaded fasteners may extend through the lips 138 of the bearings 136 into threaded openings 220. As further illustrated, the wire guide 108 is aligned with a pair of wire openings 107 in the bottom plate 106, similar to the alignment with wire openings 105 in the top plate 104 as shown in FIG. 11. Likewise, the wire clamp 260 is aligned with a wire opening 107 in the bottom plate 106, similar to the alignment with the wire opening 105 in the top plate 104 as shown in FIG. 13.

Figure 15:
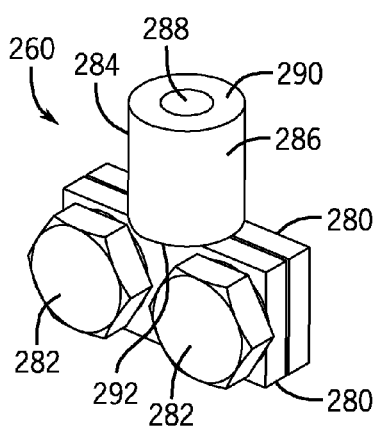
FIG. 15 is a perspective view of an embodiment of a wire clamp, illustrating a pair of wire clamp plates and an insulating wire sleeve.
Figure 16:
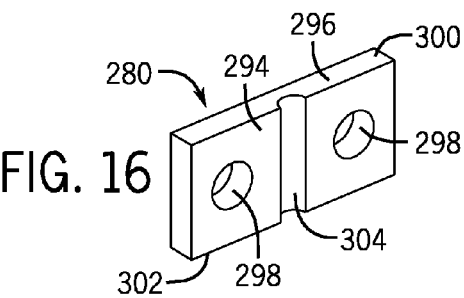
FIG. 16 is a perspective view of an embodiment of one of the wire clamp plates of FIG. 15.
Figure 17:
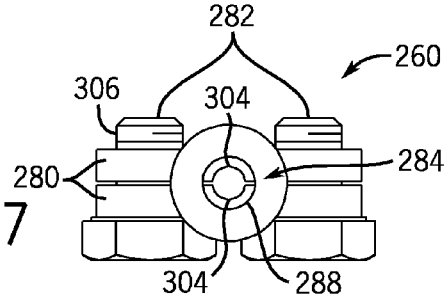
FIG. 17 is a top view of an embodiment of the wire clamp of FIG. 15.

FIGS. 15, 16, and 17 illustrate an embodiment of the wire clamp 260 of FIGS. 13 and 14. FIG. 15 is a perspective view of an embodiment of the wire clamp 260, illustrating opposite wire clamp plates 280, bolts or fasteners 282 extending through the wire clamp plates 280, and an insulating spacer or sleeve 284. The insulating spacer 284 is configured to space the wire clamp plates 280 and bolts 282 at an offset away from the top and bottom plates 104 and 106, thereby electrically and thermally isolating the wire clamp plates 280 and the bolts 282 from the plates 104 and 106. The spacer 284 has a cylindrical outer surface 286, a wire passage 288, a ring-shaped top surface 290, and a ring-shaped bottom surface 292. As discussed below, the wire passage 288 routes the SMA wire 102 in between the opposite wire clamp plates 280, which are compressed together about the SMA wire 102 via the bolts 282.

FIG. 16 is a perspective view of an embodiment of one of the wire clamp plates 280 of FIG. 15. The clamp plate 280 has a front face 294, a rear face 296, and a pair of openings 298 extending between the faces 294 and 296. The openings 298 are configured to receive the bolts 282. The clamp plate 280 also has a top surface 300, a bottom surface 302, and a groove 304 extending along the face 294 from the top surface 300 to the bottom surface 302. The groove 304 is aligned with the wire passage 288 of the spacer 284, such that it can receive the SMA wire 102. In certain embodiments, the groove 304 may be sized smaller than (e.g., 50 to 90 percent of) the radius of the SMA wire 102.

FIG. 17 is a top view of an embodiment of the wire clamp 260 of FIG. 15. As illustrated, the wire passage 288 of the spacer 284 is aligned with the grooves 304 in the opposite wire clamp plates 280, and the bolts 282 extend through the openings 298 in the opposite wire clamp plates 280. In the illustrated embodiment, the bolts 282 include threads 306 to mate with threads in at least the distal wire clamp plate 280, thereby enabling the bolt 282 to compress the plates 280 toward one another about the SMA wire 102. In operation, the bolts 282 may be loosened to separate the wire clamp plates 280, and thus widen the gap between the grooves 304. The SMA wire 102 may then be inserted through the wire passage 288 of the spacer 284 into the space between the grooves 304. Finally, the bolts 282 may be tightened to compress the wire clamp plates 280 about the SMA wire 102.

The wire clamp 260 may be made at least partially or substantially of metal, ceramic, plastic, or some combination thereof. For example, the clamp plates 280, the bolts 282, and the spacer 284 may be made of steel with an insulating coating. By further example, the clamp plates 280, the bolts 282, and the spacer 284 may be made entirely of an insulating material, such as a plastic or ceramic. However, in the illustrated embodiment, the spacer 284 may be made of an insulating material, whereas the clamp plates 280 and the bolts 282 may be made of a metal or non-insulating material. In certain embodiments, the SMA wire 102 may be coated or wrapped with an insulating material. The insulating material may be selected to provide electrical insulation and thermal insulation sufficient for the SMA materials used for the SMA wires 102.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
an accumulator configured to store a hydraulic fluid to operate equipment, wherein the accumulator comprises:
a first plate comprising a first wire guide, wherein the first wire guide comprises a first semi-circular path having a first groove, and the first wire guide is disposed adjacent a first pair of wire holes in the first plate;
a second plate comprising a second wire guide, wherein the second wire guide comprises a second semi-circular path having a second groove, the second wire guide is disposed adjacent a second pair of wire holes in the second plate, the second plate is positioned at an offset from the first plate, and the second plate is moveable relative to the first plate to adjust a fluid pressure; and
a plurality of shape memory alloy wires extending between the first and second plates, wherein the plurality of shape memory alloy wires extend along the first and second wire guides.

2. The system of claim 1, comprising a first insulative material and a second insulative material, wherein the first insulative material is disposed along the first pair of wire holes, the first groove, or a combination thereof, and the second insulative material is disposed along the second pair of wire holes, the second groove, or a combination thereof.

3. The system of claim 1, wherein the first wire guide comprises a first pair of wire sleeves and the first semi-circular path having the first groove, and the second wire guide comprises a second pair of wire sleeves and the second semi-circular path having the second groove.

4. The system of claim 3, wherein the first pair of sleeves is disposed adjacent opposite ends of the first groove, and the second pair of sleeves is disposed adjacent opposite ends of the second groove.

5. The system of claim 4, wherein the first pair of sleeves and the second pair of sleeves comprise an insulative material.

6. The system of claim 4, wherein the first semi-circular path and the second semi-circular path comprise an insulative material.

7. The system of claim 4, wherein the first pair of sleeves is disposed in the first pair of wire holes in the first plate, and the second pair of sleeves is disposed in the second pair of wire holes in the second plate.

8. The system of claim 1, wherein the first plate comprises a first circular pattern of wire guides, and the second plate comprises a second circular pattern of wire guides.

9. The system of claim 8, wherein the first circular pattern of wire guides comprises a first plurality of concentric rings of wire guides, and the second circular pattern of wire guides comprises a second plurality of concentric rings of wire guides.

10. The system of claim 1, comprising:
a first cylinder configured to receive a fluid within an internal volume of the first cylinder;
a piston axially movable within the first cylinder, wherein axial movement of the piston within the first cylinder adjusts the internal volume of the first cylinder; and the second plate is moveable with the piston;
a power supply that supplies an electrical current through the shape memory alloy wires; and
a controller comprising a memory with instructions, wherein the controller adjusts the supply of electrical current through the shape memory alloy wires, and the controller adjusts the supply of electrical current through the shape memory wires based at least in part on a measurement sensed from the accumulator.

11. A system, comprising:
a shape memory alloy powered drive, comprising:
a first plate comprising a plurality of first pairs of holes;
a plurality of first wire guides, wherein each first wire guide of the plurality of first wire guides comprises a first semi-circular section having a first groove and a first pair of wire sleeves disposed adjacent opposite ends of the first groove, wherein each first pair of wire sleeves is disposed in one of the first pairs of holes in the first plate;
a second plate;
a plurality of second wire guides adjacent the second plate, wherein the first and second plates are disposed at an offset from one another, and the second plate is moveable relative to the first plate;

a plurality of shape memory alloy wires extending along the plurality of first wire guides; and a controller comprising a memory with instructions, wherein the controller adjusts a supply of electrical current through the shape memory wires to adjust a force on the first plate.

12. The system of claim 11, wherein each first wire guide comprises a first curved path having the first groove extending from a first hole to a second hole of one of the first pairs of holes in the first plate.

13. The system of claim 11, wherein the second plate comprises a plurality of second pairs of holes, wherein each second wire guide of the plurality of second wire guides comprises a second semi-circular section having a second groove and a second pair of wire sleeves disposed adjacent opposite ends of the second groove, wherein each second pair of wire sleeves is disposed in one of the second pairs of holes in the second plate.

14. The system of claim 11, comprising an insulative material disposed along each of the plurality of first pairs of holes, each first groove, or a combination thereof.

15. A method for actuating an accumulator, comprising:

supplying an electrical current to a plurality of shape memory alloy wires extending along wire guides coupled to first and second plates to cause movement of the first plate relative to the second plate, wherein each wire guide comprises a semi-circular path with a groove, a first one of the wire guides is disposed adjacent a first pair of wire holes in the first plate, and a second one of the wire guides is disposed adjacent a second pair of wire holes in the second plate; and insulating the first and second plates from the electrical current passing through the plurality of shape memory alloy wires with insulative material disposed along the first pair of wire holes in the first plate, the second pair of wire holes in the second plate, a groove in the wire guides, or a combination thereof.

16. The method of claim 15, comprising distributing force between the first and second plates via the plurality of shape memory alloy wires extending back and forth between a first circular pattern of wire guides coupled to the first plate and a second circular pattern of wire guides coupled to the second plate.

* * * * *